US00RE34154E

United States Patent [19]

Lee

[11] E Patent Number: Re. 34,154

[45] Reissued Date of Patent: Jan. 5, 1993

[54] SUCTION GUIDE DEVICE FOR DEHUMIDIFIER

[75] Inventor: Shin H. Lee, Suwon, Rep. of Korea

[73] Assignee: Samsung Electronics Co., Ltd., Suwon, Rep. of Korea

[21] Appl. No.: 701,034

[22] Filed: May 16, 1991

Related U.S. Patent Documents

Reissue of:

[64] Patent No.: 4,953,364
Issued: Sep. 4, 1990
Appl. No.: 375,627
Filed: Jul. 5, 1989

[30] Foreign Application Priority Data

May 7, 1988 [KR] Rep. of Korea ..... 1988-10917

[51] Int. Cl.[5] ..... F25D 21/14

[52] U.S. Cl. ..... 62/285; 62/295; 415/220; 454/346

[58] Field of Search ..... 62/285, 288, 291, 407, 62/419, 426, 295; 165/69; 415/220; 98/42.08; 454/346

[56] References Cited

U.S. PATENT DOCUMENTS

| | | | |
|---|---|---|---|
| 1,635,869 | 7/1927 | Weisz | 62/426 |
| 2,001,832 | 5/1935 | Bandurski | 62/285 |
| 2,120,830 | 6/1938 | Brizzolara | 62/426 |
| 2,232,459 | 2/1941 | Hull | 62/426 |
| 2,682,758 | 7/1954 | Harris | 62/291 |
| 2,747,383 | 5/1956 | Schlumbohm | 62/288 |
| 3,303,666 | 2/1967 | Toper | 62/426 |
| 4,712,382 | 12/1987 | LeClear | 62/288 |

FOREIGN PATENT DOCUMENTS 55-56334 4/1980 Japan .

*Primary Examiner*—William E. Tapolcai
*Attorney, Agent, or Firm*—Sterne, Kessler, Goldstein & Fox

[57] ABSTRACT

A suction guide device for a dehumidifier is disclosed in which the suction guide member consists of an insertion section, an expanded section and a tapered section connecting the former two sections, and accommodates an evaporator, a condenser and a suction means therein.

Further, the suction guide member is firmly secured at its front and rear ends unlike the case of the conventional device, and therefore the device according to the present invention prevents the vibrations and noise, and saves power consumption during the operation, thereby making the dehumidifier using the deivce of the prevent invention economical, useful and practical.

Further, the discharged air from the holes of the tapered section is guided so that it passes close to the compressor, thereby contributing to the advantages mentioned above, because the air being discharged efficiently cools the compressor.

28 Claims, 2 Drawing Sheets

SUCTION GUIDE DEVICE FOR DEHUMIDIFIER

Matter enclosed in heavy brackets [ ] appears in the original patent but forms no part of this reissue specification; matter printed in italics indicates the additions made by reissue.

FIELD OF THE INVENTION

The present invention relates to a suction guide device for an air conditioning apparatus, such as a dehumidifier, which intakes the room air to dehumidify it and thereafter discharges the dehumidified air to the outside, and particularly to a suction guide device for an air conditioning apparatus, in which a suction guide member in the shape of a hopper containing an evaporator, a condenser and a fan motor is installed at the upper portion of the body of the air conditioning apparatus, thereby preventing noise and improving the dehumidifying efficiency.

BACKGROUND OF THE INVENTION

Generally, presently available suction guide devices for dehumidifiers are constituted as described below. Shown in FIG. 1, an evaporator 2 and a condenser 3 are installed in parallel at the front and rear of the upper portion of the dehumidifier body 1, while a suction means 6 accommodated within a section guide member 7 is installed in a suspending manner by means of a vertical securing beam 4A and a horizontal securing beam 4B, the former being installed along the rear wall of the body 1 and the latter being fitted into a frontal frame 5.

The suction guide member 7 is disposed to the rear of the condenser 3, only partially covering the condenser 3.

However, in such a conventional device, since the suction means is secured in a suspended manner by means of the vertical and horizontal beams, its secured state is not firm enough, with the result that noise is generated during the operation. Further, the attachment mechanism is very complicated, requiring a large number of assembly steps, with the result that manufacturing productivity is very low. Also, the conventional device does not provide for efficient cooling of the compressor. This in turn creates the effects that the overall cycle temperature is raised, and power consumption is increasaed, thereby making the device uneconomical.

SUMMARY OF THE INVENTION

The present invention is intended to overcome the above-described disadvantages of the conventional device.

Therefore, it is an object of the present invention to provide a suction guide device for a dehumidifier, in which the guide member is firmly secured, assembly is simplified, noise is prevented, and the compressor is cooled efficiently, so that the efficiency of the dehumidifier can be improved.

In achieving the above object, the device of the present invention is constituted such that a guide member in the form of a unitary enclosure and having an expanded portion in the shape of a hopper is secured at its front and rear ends. The guide member includes: an insertion section which houses a suction means therein, and which is firmly attached to a supporter uprightly installed on the compressor; an expanded section which houses an evaporator and a condenser therein, and which has a fitting protuberance for being secured to a retaining projection of the front panel; and a tapered section which is formed between the insertion section and the expanded section, and which is provided with numerous holes for discharging the intake air.

BRIEF DESCRIPTION OF THE DRAWINGS

The above object and other advantages of the present invention will become more apparent by describing in more detail the preferred embodiment of the present invention with reference to the attached drawings in which.

DESCRIPTION OF THE PREFERRED EMBODIMENT

Figure 1:
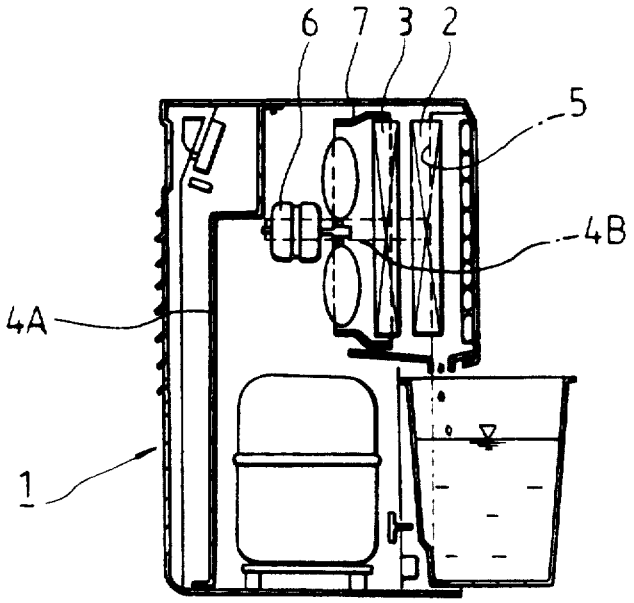
FIG. 1 PRIOR ART
FIG. 1 is a schematic representation of the structure of a conventional dehumidifier.
Figure 2:
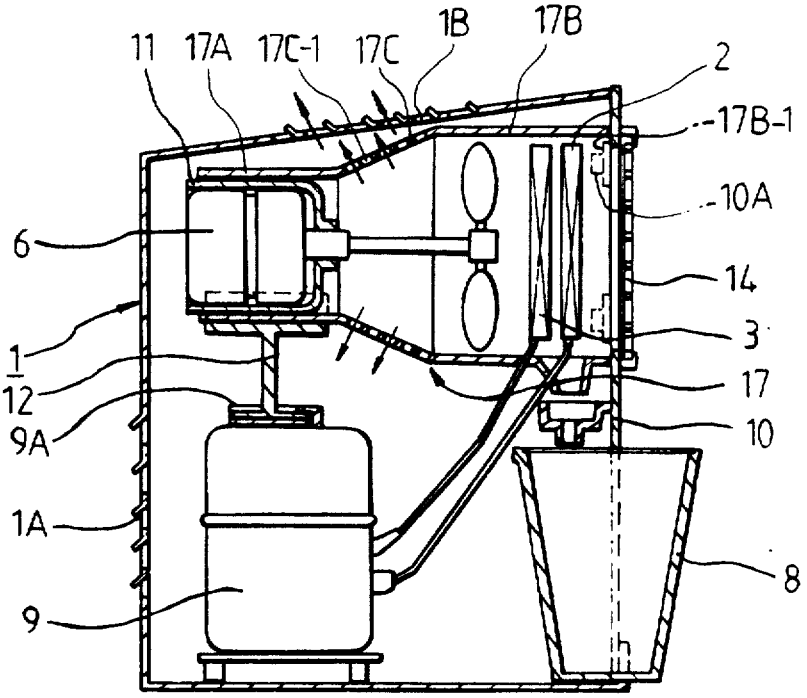
FIG. 2 is a side view of the dehumidifier in which the suction guide device of the present invention is installed.
Figure 3:
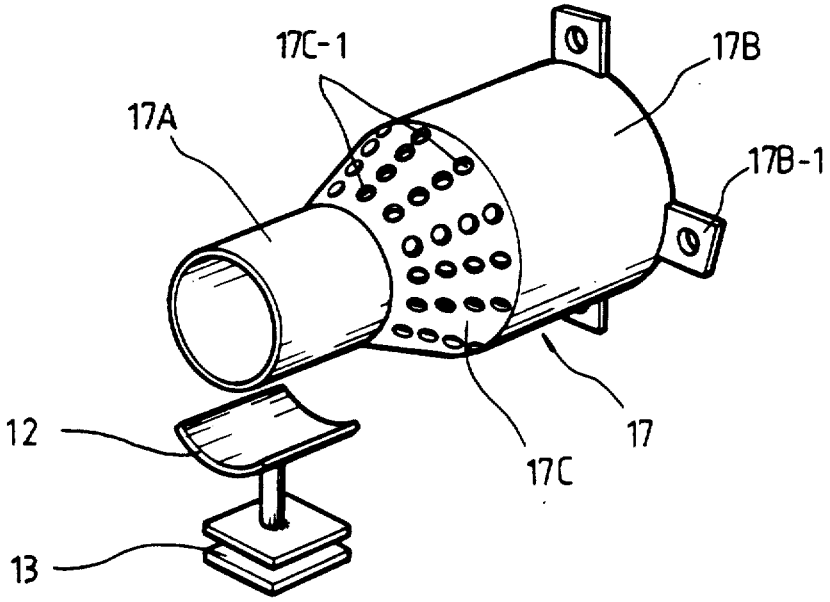
FIG. 3 is an enlarged perspective view of the suction guide member of the present invention.
Figure 4:
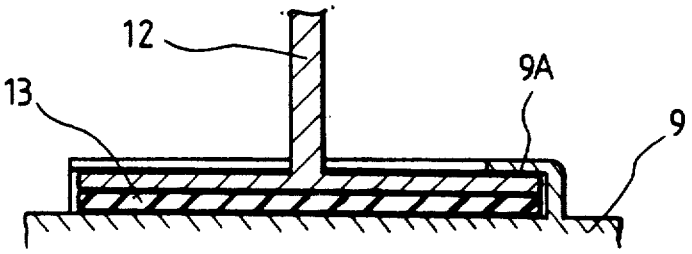
FIG. 4 is an enlarged sectional view of a critical portion showing the insertion fitting state of the supporter of the suction guide member according to the present invention.

In the following description, like reference numbers in the several figures refer to the same elements.

The dehumidifier according to the present invention contains a water tank 8 for collecting the water and a compressor 9, respectively at the front and rear of the lower portion of the dehumidifier body 1. A suction guide member 17 in the shape of a hopper is located at the upper portion of the body 1. The suction guide member 17 accommodates an evaporator 2, a condenser 3 and a suction means 6 disposed at the rear of condenser 3. Suction guide member 17 consists of an insertion section 17A, an expanded section 17B, and a tapered section 17C. The expanded section 17B accommodates the condenser and evaporator. The frontal circumferential edge of the expanded section 17B is also provided with a fitting protuberance 17B-1 for being press-fitted to a retaining projection 10A which is provided on the front panel 10.

Meanwhile, the suction means 6 is press-fitted into the insertion section 17A using a bush 11, while a supporter 12 is inserted between the insertion section 17A and compressor 9 in such a manner that the insertion section 17A should be supported by the supporter 12.

The supporter 12 is secured by being slidably inserted into an insertion rail 9A which is formed on the compressor.

The tapered section 17C which connects the insertion section 17A and the expanded section 17B is provided with a large number of through holes 17C-1 for discharging the dehumidified air.

A shock absorbing means 13 for absorbing the vibrations is disposed between the compressor 9 and the supporter 12, while the body 1 is provided with air discharge holes 1A, 1B on the top thereof. The shock absorbing means 13 could be comprised of, for example, rubber, plastic, felt or other material capable of dampening vibrations.

A frontal grill 14 covers the front of suction guide member 17.

The device of the present invention constituted as above will now be described as to its action and effect.

First, the air of the room is sucked by means of the suction means 6 through the front grill 14 into the evaporator 2 and the condenser 3.

Then, during the process of passing air through the evaporator and the condenser, moisture contained in the air is removed and the collected water is stored in the water tank 8.

The dehumidified air is discharged due to the function of the suction means through the holes 17C-1 formed in the tapered section to the room.

As described above, the front end of the suction guide member is secured to the front panel in a fitting manner, while the rear end of the suction guide member is supported by means of supporter 12.

Therefore, assembly of the suction guide member is simple, with the result that manufacturing productivity is increased.

Further, as the suction means 6 is inserted into the rear insertion section 17A to be secured therein, the installation of the suction means is very simple, and the suction means can be concentrically maintained in an easy manner, with the result that vibrations and noise can be prevented during the operation of the dehumidifier.

Further, the air discharged through the holes 17C-1 formed on the tapered section 17C which connects between the insertion section 17A and the expanded section 17B is blown so that it passes close to the compressor 9.

Therefore, the compressor can be cooled efficiently, and the overall cycle temperature is lowered, so that the dehumidifying efficiency is improved, and power consumption is reduced, thereby making the device of the present invention economical, useful and practical.

What is claimed is:

1. A suction guide device for an air conditioning apparatus, comprising: a unitary enclosure in the shape of a hopper having an extended section with an air inlet and adapted to house an evaporator adjacent said air inlet and a condenser adjacent said evaporator; an insertion section housing a suction means for directing a flow of air through said unitary enclosure; and a central tapered section formed between said insertion section and said extended section, said central tapered section having an air outlet.

2. A suction guide device in accordance with claim 1, wherein said suction means is in a fixed position with respect to said condenser and said evaporator.

3. A suction guide device in accordance with claim 1, further comprising a supporter means supporting said insertion section of said unitary enclosure relative to an outer enclosure of said air conditioning apparatus.

4. A suction guide device in accordance with claim 1, wherein said central tapered section is provided with a plurality of through holes serving as said air outlet.

5. A suction guide device in accordance with claim 1, wherein said suction means is a motor driven fan blade.

6. A suction guide device in accordance with claim 1, further comprising a frontal grill covering said air inlet of said unitary enclosure.

7. A suction guide device in accordance with claim 3, wherein aid supporter means connects said insertion section and said extended section of said unitary enclosure to said outer enclosure of said air conditioning apparatus.

8. A suction guide device in accordance with claim 3, further comprising a compressor disposed inside said outer enclosure and outside said unitary enclosure.

9. A suction guide device in accordance with claim 3, wherein aid supporter means comprises an absorbing means situated between said unitary enclosure and aid outer enclosure for absorbing vibrations emanating from said unitary enclosure.

10. A suction guide device in accordance with claim 8, further comprising an insertion rail disposed on said compressor to which said supporter means is slidably attached.

11. A suction guide device in accordance with claim 8, wherein said air outlet is adapted to channel a portion of air passing through said air outlet in contact with said compressor.

12. A suction guide device for installation within the outer enclosure of an air conditioning apparatus, comprising: a unitary inner enclosure in the shape of a hopper, said inner enclosure having an extended section with an air inlet and adapted to house an evaporator adjacent said air inlet and a condenser adjacent said evaporator; an insertion section for housing a suction means for directing a flow of air through said inner enclosure; a central tapered section formed between said insertion section and said extended section, said central tapered section having an air oulet; and a supporter means adapted to connect said insertion section of said enclosure to said outer enclosure.

13. A suction guide device in accordance with claim 12, wherein said suction means is in a fixed position with respect to said condenser and said evaporator.

14. A suction guide device in accordance with claim 12, wherein said central tapered section is provided with a large number of through holes serving as said air outlet.

15. A suction guide device in accordance with claim 12, wherein said suction means includes a motor driven fan blade.

16. A suction guide device in accordance with claim 12, wherein a frontal grill covers said air inlet of said unitary inner enclosure.

17. A suction guide device in accordance with claim 12, wherein a compressor is disposed inside said outer enclosure and outside said unitary inner enclosure.

18. A suction guide device in accordance with claim 12, wherein said supporter means comprises an absorbing means for absorbing vibrations emanating from said unitary inner enclosure.

19. A suction guide device in accordance with claim 17, wherein an insertion rail resides on said compressor to which said supporter means is slidably attached.

20. A suction guide device in accordance with claim 17, wherein said air outlet is adapted to channel a portion of air passing through said air outlet in contact with said compressor.

21. A suction guide device for installation within the outer enclosure of an air conditioning apparatus, comprising: a unitary inner enclosure in the shape of a hopper, said inner enclosure having an extended section with an air inlet and adapted to house an evaporator adjacent said air inlet and a condenser adjacent said evaporator; an insertion section for housing a suction means for directing a flow of air through said unitary inner enclosure; a central tapered section formed between said insertion section and said extended section, said central tapered section having an air outlet; and a supporter means for connecting said insertion section of said enclosure to said outer enclosure and for absorbing vibrations of said unitary inner enclosure.

22. A suction guide device in accordance with claim 21, wherein said suction means is in a fixed position with respect to said condenser and said evaporator.

23. A suction guide device in accordance with claim 21, wherein said central tapered section is provided with a large number of through holes serving as said air outlet.

24. A suction guide device in accordance with claim 21, wherein said suction means includes a motor driven fan blade.

25. A suction guide device in accordance with claim 21, wherein a frontal grill covers said air inlet of said unitary inner enclosure.

26. A suction guide device in accordance with claim 21, wherein a compressor is disposed inside said outer enclosure and outside said unitary inner enclosure.

27. A suction guide device in accordance with claim 26, wherein an insertion rail resides on said compressor to which said supporter means is slidably attached.

28. A suction guide device in accordance with claim 23, wherein said air outlet is adapted to channel a portion of air passing through said air outlet in contact with said compressor.

* * * * *